July 21, 1925.
A. RÖMER
1,546,511
SOLDERING IRON
Filed March 26, 1925
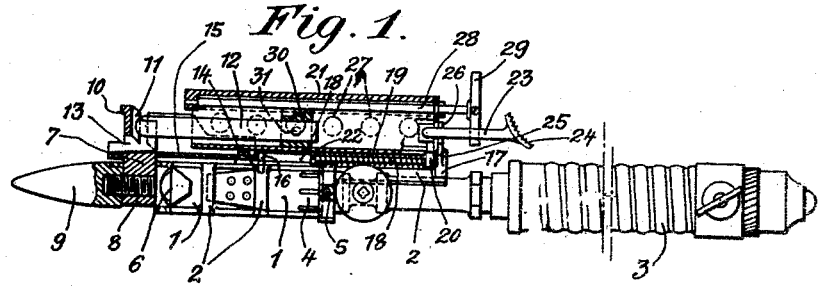
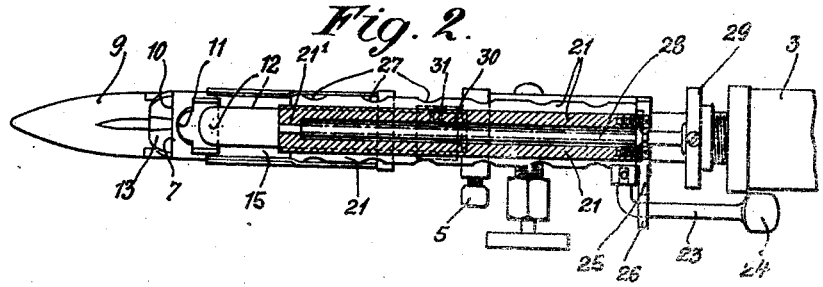
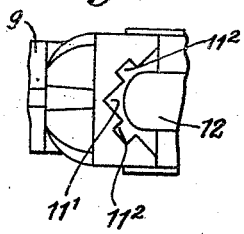
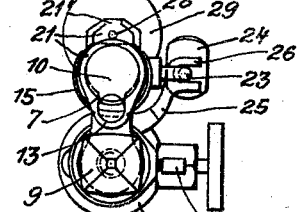
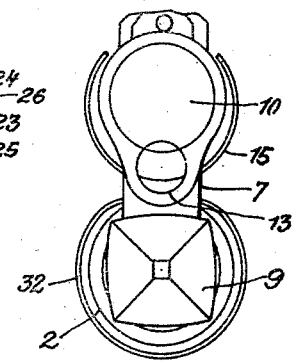
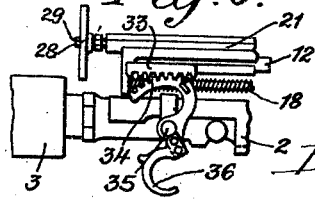
Inventor
A. Römer
By Marks & Clerk
Attys.

Patented July 21, 1925.

1,546,511

UNITED STATES PATENT OFFICE.

AUGUST RÖMER, OF ZOFINGEN, SWITZERLAND.

SOLDERING IRON.

Application filed March 26, 1925. Serial No. 18,622.

*To all whom it may concern:*

Be it known that I, AUGUST RÖMER, a subject of Germany, residing at Zofingen, Bundtengassli 692, in the Canton of Aargau and Republic of Switzerland, have invented certain new and useful Improvements in Soldering Irons, of which the following is a specification.

Soldering irons with solder supplying means are known, wherein a rod of solder is displaceable by means of a feeding or transporting device and returnable by means of a spring after the release of the said device. In these known soldering irons the feeding and the limited return of the rod of solder are effected by means of a leaf spring carried by a bar and a pawl-like arresting spring. This is not a positive method of feeding and returning the rod of solder, and the springs exposed to the high temperature easily break or become crippled and thus give rise to serious trouble. Furthermore the supplying of the liquid solder through a narrow duct to the soldering point or the supplying of it to the soldering iron through a small tube has the disadvantage that these paths, by incrustation, and also by overheating of the solder, become constricted, and in the long run render faultless soldering impossible.

In the case of the present soldering iron, with a supplying device of the said kind, the aforementioned disadvantages are removed by the fact that in a sleeve which is longitudinally displaceable against the pressure of a spring is supported a screw spindle provided with a small hand wheel, a solder holder being mounted on the said spindle in the manner of a nut and being so arranged as to be displaceable for the feeding of the solder according to the consumption of solder, the solder melting out of a perpendicular channel flowing through a horizontal channel to the soldering iron. In the case of this soldering iron the forward and return movements and also the subsequent feeding of the solder are accordingly effected positively, and stoppages in the flow of solder to the iron are precluded. The tapering or pointing of the soldering iron also is not hindered by any parts.

The invention is illustrated by way of example in the accompanying drawing.

Figure 1 is a sectional elevation of the device, together with the benzine container;

Figure 2 is a sectional plan, drawn to a larger scale; and

Figure 3 a front elevation thereof.

Figure 4 is a plan of a detail modification, and

Figure 5 shows the employment of a so-called windscreen tube on the soldering device.

Figure 6 shows a modified device to feed the soldering metal carrying sleeve.

The framework of the device comprises a tubular piece 2, provided with lateral apertures 1, said tubular piece being slipped over the Bunson burner 4 secured to the gasoline tank 3 and adjustably secured to the burner by means of a clamping screw 5. The clamping screw enables the device to be readily applied to and removed from the burner. The tubular piece 2 is mounted on the cylindro-conical head 6 of the outflow piece, in which a screw threaded journal 8 is screwed. On to this journal the soldering iron 9 is exchangeably screwed. The outflow piece 7, preferably consisting of aluminium, comprises in the perpendicular wall 10, against which, during soldering, the soldering metal is pressed, a perpendicular channel 11, into which the front end of the soldering metal rod 12 can enter, and a horizontal outflow channel 13, out of which the molten soldering metal flows on to the soldering iron and into a channel fitted thereto. A tubular piece of sheet metal 15 connected in front to the outflow piece 7 and secured at the back by a bolt 14 to the tubular piece 2, forms a rearward prolongation of the outflow channel 13 in the piece 7. This channel may also be integral with the piece 7, as a rearward prolongation of the channel 13.

In front and rear attachments, 16 and 17 respectively, of the tubular piece 7, is secured a bar 18, which is quadrangular in the front part and round in the rear part, and upon which a spring 19 is mounted. This is supported at the back upon a projection 20 of the forwardly and rearwardly displaceable soldering metal carrying sleeve 21 and in the front upon the rear end face of the quadrangular part of the rod 18. A stop 22 on the soldering metal carrying sleeve 21 with a quadrangular hole is displaceable upon the quadrangular part of the bar 18, and a lateral angle arm 23 extending outwards from the sleeve 21, with a pressure plate 24 for the thumb of the right hand, is guided in a lateral arm 25 extending outwards from the stop 17 and having a fork support 26. By pressing on the plate 24 the soldering metal carrying sleeve 21 is pushed forward and the soldering metal 12 brought to the wall 10 of the outflow piece 7, which is heated during soldering, in order to melt said soldering metal. If the flow of soldering metal is to cease, the right thumb releases the pressure plate 24, whereupon the spring 19 pushes back the soldering metal carrying sleeve until the carrying sleeve stop 20 strikes against the tubular piece stop 17.

In the upper part of the soldering metal carrying sleeve 21, which is provided with air holes 27 and is open at the back, a screw spindle 28, with driving discs 29 is so supported as to be rotatable but not axially displaceable. On the spindle 28 is mounted the internally screw threaded prismatic upper part of the holder sleeve 30 for the bar of soldering metal 12, which is guided into a prismatic part 21$^1$ of the sleeve 21, said bar of soldering metal being secured in the sleeve 30 with a clamping screw 31. By rotating the small hand wheel 29, which can likewise be effected with the right thumb, the spindle 28 can be rotated and the holder sleeve 30 thereby pushed forwards and the soldering metal advanced according to the amount consumed. Owing to this advancing movement an almost complete utilization of the soldering metal is possible. For introducing a fresh bar of soldering metal the hand wheel 29 is removed and the fresh bar of metal introduced from the rear into the holder sleeve 30, which is screwed right back, and secured therein, whereupon the hand wheel 29 is replaced on the spindle 28.

Any choking of passages is precluded with this device. Only one hand is needed for handling it, including feeding forward and advancing the soldering metal, so that the other hand is free for handling the piece of work. By the burner flame the soldering metal is pre-heated, so that it melts more quickly.

In the case of the detail modification according to Figure 4, the perpendicular channel 11$^1$ is acute angled in cross section, and each lateral surface of the channel possesses a small channel 11$^2$ of rectangular cross section, through which likewise molten solder can flow down.

Figure 5 shows the application of a so-called windscreen tube 32 to the tubular piece 2, said tube guiding the soldering flame forwards and protecting it from the influence of lateral draughts.

In the modification shown by Figure 6, the angle arm 23 and pressure plate 24 are dispensed with and replaced by a toothed rack 33 integral with the sleeve 21 on the other side thereof, and by a toothed segment 34 meshing with the rack 33 and pivotally mounted upon a pin 35 fixed to the stationary tubular piece 2. This segment has a triggerlike operating handle 36, which may be drawn back by the fore-finger when the sleeve has to be fed. In this modification the thumb will be free to grasp the tank 3 being no more necessary to feed forward the sleeve 21.

Instead of being heated by a gas or gasoline flame, the soldering iron may be heated electrically.

What I claim is:—

1. A soldering iron comprising a longitudinally displaceable sleeve, a spring adapted to resist longitudinal displacement of said sleeve, a screw spindle supported in said sleeve, a hand wheel provided on said screw spindle, a solder holder mounted in the manner of a nut on said screw spindle and being so arranged as to be displaceable for the feeding of solder according to the consumption thereof, and an outflow piece formed with a perpendicular channel so positioned that a stick of solder placed in said solder holder projects into it and with a horizontal channel communicating with said perpendicular channels and leading to the tip of the soldering iron.

2. A soldering iron comprising a longitudinally displaceable sleeve carrying a toothed rack, a toothed segment pivotally mounted on a stationary tubular piece, meshing with the said rack and having a triggerlike operating handle to move forward the said sleeve, a spring adapted to resist longitudinal displacement of said sleeve, a screw spindle supported in said sleeve, a hand wheel provided on said screw spindle, a solder holder mounted in the manner of a nut on said screw spindle and being so arranged as to be displaceable for the feeding of solder according to the consumption thereof, and an outflow piece formed with a perpendicular channel so positioned that a stick of solder placed in said solder holder projects into it and with a horizontal channel communicating with said perpendicular channels and leading to the tip of the soldering iron.

3. A soldering iron comprising a longitudinally displaceable sleeve, a spring adapted to resist longitudinal displacement of said sleeve, a screw spindle supported in said sleeve, a hand wheel provided on said screw spindle, a solder holder mounted in the manner of a nut on said screw spindle and being so arranged as to be displaceable for the feeding of solder according to the consumption thereof, and an outflow piece formed with a perpendicular channel acute angled in cross section, each lateral surface of this channel having a small channel of rectangular cross-section, all these channels being so positioned that a stick of solder placed in said solder holder projects into it and with a horizontal channel communicating with said perpendicular channels and leading to the tip of the soldering iron.

In testimony whereof I have affixed my signature in presence of two witnesses.

AUGUST RÖMER.

Witnesses:
 OSSAKAN WODICKA,
 HERMANN HUBER,